United States Patent [19]

Bradmon

[11] 4,268,165

[45] May 19, 1981

[54] APPARATUS AND METHOD FOR CONTROLLING THE ADJUSTMENT OF OPTICAL ELEMENTS IN AN ELECTROPHOTOGRAPHIC APPARATUS

[75] Inventor: Paul J. Bradmon, Longmont, Colo.

[73] Assignee: International Business Machines Corporation, Armonk, N.Y.

[21] Appl. No.: 104,206

[22] Filed: Dec. 17, 1979

[51] Int. Cl.³ .............................................. G03B 27/52
[52] U.S. Cl. ......................................... 355/55; 354/25
[58] Field of Search ....................... 355/50, 51, 68, 63, 355/55, 56; 354/31, 25; 350/247, 101, 46; 324/61 R; 340/146.3 F; 358/93

[56] References Cited

U.S. PATENT DOCUMENTS

| | | | |
|---|---|---|---|
| 3,510,219 | 5/1970 | Liva | 355/55 |
| 3,623,790 | 11/1971 | Buckstad et al. | 355/55 X |
| 3,662,662 | 5/1972 | Dewan | 354/25 |
| 3,691,922 | 9/1972 | König et al. | 354/25 |
| 4,171,885 | 10/1979 | Kondo | 354/31 X |
| 4,175,855 | 11/1979 | Turner et al. | 355/68 |
| 4,176,928 | 12/1979 | Nakamura et al. | 354/31 |

*Primary Examiner*—Richard A. Wintercorn
*Attorney, Agent, or Firm*—Gunter A. Hauptman

[57] ABSTRACT

The optical elements of a copier are automatically aligned by positioning the elements under the control of signals from an image-dissecting scanner. The scanner, mounted to receive the image normally presented to the photoconductor, examines a master document placed in the position normally occupied by a document to be copied. Optical adjustments are made as a function of the examination of lines on the master document by the scanner. The contrast between a line and its background is maximum when optical elements between the master document and the scanner provide the sharpest focus of the line image to the scanner. Signals from the scanner for a plurality of lines on the master document determine optimum positioning of the optical elements. The scanner determines the apparent spacing between lines, which are a known distance apart on the master document, to position the optical elements for a desired magnification. The positions of selected lines, examined by the scanner, relative to absolute reference points are used to align the master document support for subsequent copying of original documents.

Digitized light-level value samples from the scanner are pushed into a last-in/first-out stack. A value significantly less than the average of the values in the stack indicates that the scanner has found a line. A plurality of scans of the line are then made while adjusting the optical elements. Corresponding light values are pushed into the stack and the average of the values stored in the stack is calculated. If the average is greater than previously calculated averages, a number of additional scans are made to insure that the best focus adjustment has been identified.

16 Claims, 15 Drawing Figures

PROCESSOR 29

MOTION INTERFACE (26) OUTPUT
(1 of 9)

MOTION INTERFACE (26) INPUT
(1 of 9)

SCAN SUBROUTINE

APPARATUS AND METHOD FOR CONTROLLING THE ADJUSTMENT OF OPTICAL ELEMENTS IN AN ELECTROPHOTOGRAPHIC APPARATUS

BACKGROUND OF THE INVENTION

1. Field of the Invention

The invention relates to an electrophotographic apparatus and, more particularly, to automatically determining and achieving optimum optical focus therein.

2. Description of the Prior Art

An electrophotographic apparatus, for example a copier using xerographic principles, focuses an illuminated image of an original document on a photoconductive surface. The surface is selectively charged and discharged in accordance with the image. Copies of the original result from the transfer of a developing material from this surface to the copy medium. A basic determinant of copy quality is therefore the accuracy of the image focus. Since the image is usually scanned onto the photoconductor by a moving reflector, another important factor in copy quality is the accuracy of the relationships among the scanning elements. Copiers often permit the copy to be smaller than the original, an affect obtained by optical manipulation. The accuracy of this manipulation will have a significant affect on copy quality. A document glass is normally used to position the original document. The placement of index marks on the glass relative to the image ultimately formed on the photoconductor surface significantly affects copy quality.

Assuming that the above factors affecting copy quality can be accurately adjusted and aligned initially, with time, the copy quality will, nevertheless, deteriorate due to mechanical wear, slippage, stretching and the like.

It is, therefore, evident that an accurate initial adjustment and alignment technique is essential to the manufacture of a high-quality copier and that if this technique is simple, the same technique will be useful in maintaining the operation of a copier.

Typically, adjustment of lenses, lights, carriages, fiber optic bundles, reflectors, mirrors, document glasses, etc. has been performed manually by skilled technicians. For example, the photoconductor surface may be replaced with a temporary screen for viewing the image during adjustment. The technician then adjusts the copier elements for the best apparent focus. Depending upon the complexity of the copier, the "best" focus may occur for different adjustments depending upon, for example, what part of the original document is scanned or whether the copy is being reduced. Among the problems with this approach is the difficulty of imitating the actual copier operation (such as scanning), the requirement that a "best" focus be selected from among several possible best foci, reliance upon the technician's subjective evaluation of focus and the normal human failings resulting from fatigue and inattention. In addition, this approach is slow and gives inconsistent, as well as inaccurate, results. As the copier gets smaller and more complex, it becomes even more difficult to quickly make the accurate adjustments necessary for an economically manufacturable copier.

The prior art discloses some attempts to minimize the manual steps involved in adjusting and aligning copiers. In U.S. Pat. No. 3,510,219, a variety of manual adjustments are facilitated by providing a leveling device for the document glass, a universally adjustable lens mounting, and the like. It is also known to place a television camera in a position which permits the technician to conveniently view the image essentially as it would appear on the photoconductor surface. Accuracy of adjustment and alignment has also been increased by substituting, during manufacture, a narrow beam of coherent light for the light source normally used during copying. None of these approaches eliminates all the manual steps and, therefore, to some extent, they all share the shortcomings inherent in humans.

Partially automated focusing and alignment systems are known in the prior art. In U.S. Pat. No. 3,623,790, a servo loop maintains a constant spacing between a lens and a film plane to both guarantee focus and avoid contact with the film. In U.S. Pat. No. 4,007,326, an electrical analog of a copy image is compared with an electrical analog of an original image. The copy and the original are adjusted until a comparison circuit connected to a television monitor causes the television images to cancel—indicating correct focus. U.S. Pat. No. 3,662,662 uses two optical systems to illuminate two photo cells. If one optical system is adjusted identically to the other (reference) system, both cells will be equally iluminated—indicating correct focus. All the foregoing require either human judgment, duplicate optics or rigidly-fixed adjustment parameters.

Attempts have been made to completely remove the subjective human element from the determination of focus. In U.S. Pat. No. 3,691,922, the point of sharpest focus occurs when a photocell detects a predetermined brightness/darkness distribution. In U.S. Pat. No. 3,593,286, an electronic image dissector tube is used to electronically scan an optical image and store electrical signals of the image for subsequently establishing similarities or changes between successive images. An electronic light sensor mechanically scans an image to determine the point of best focus in the Focatron Model P-122 marketed by Logetronics, Inc., Alexandria, Virginia. In the foregoing, changes in light distribution are analyzed and the plane of sharpest image is recognized when the largest number of target objects is recognized. An ITT Model F4100 Vidissector camera tube used in ITT Model F5019 camera unit marketed by the ITT Aerospace/Optical Division, Fort Wayne, Indiana, electronically scans an image and supplies signals indicative of image light levels. A suggested procedure for determining the sharpest vidissector camera focus includes the step of monitoring the video output for maximum white level and dark level response. In an IBM TECHNICAL DISCLOSURE BULLETIN article published July, 1972, pages 504–505, focusing is automatically adjusted as a function of a comparison between the widths of photocurrent pulses from light detectors.

SUMMARY OF THE INVENTION

The invention automatically adjusts and aligns a copier's optical system during manufacture and prior to normal use as described in copending application Ser. No. 104,255, filed Dec. 17, 1979, "Automatic Alignment of Optical Elements in an Electrophotographic Apparatus", by I. P. Birdsall, P. J. Bradmon, D. L. Buddington, V. H. Garcia and D. S. Nelson, assigned to International Business Machines Corporation. The position on the document glass normally occupied by an original document is filled by a master document carrying an alignment target of specially placed lines. The target is illuminated by the copier's normal light source operated in its normal manner. For example, in a scanning light system, a bar of light scans the target. At the position normally occupied by the photoconductor is placed an image dissector electronic scanning camera connected to control circuits. The control circuits control electronic scanning of areas on the target, receive information from the camera identifying the locations scanned, and control drive motors which reposition the camera to different target areas and adjust various elements of the copier's optical system.

In operation, the camera is positioned to a target area having a line. A scan is made until the line position is located and, then, repeated scans of the line location are made while the optical system is adjusted in steps through various degrees of focus.

Light level is measured during the line location scan. The line edge position is initially identified by a drop in light level from a predetermined function of the measured (background) light level. When the light level drops, the background light level is stored for subsequent focus determination. This line is then repeatedly scanned while the optical elements are adjusted to change the focus. The controls record the degree of focus detected as a function of the light level available to the camera during each scan—the lower the light level, the sharper the focus. Line focus is determined by comparing light levels, measured while scanning a line, with the previously stored light levels. The lowest light level, less than the stored background light level, is the focus value of the line. The operation is repeated for a number of preselected target areas, each containing a line.

In more detail, the light level detected by the camera at each point is digitized, and digital data representing both the light value and the corresponding position are supplied to a processor. A last-in/first-out "push-down" (or "push-up") stack of registers receives the digital data under the control of signals stored in the processor. Initially, the camera reads the background of the image before the line is encountered. Several successive, essentially identical, light values result. These are digitized and their average is stored in a "compare" location. When a line is encountered, the light value will be significantly less than the light value for the background (for a dark line on a bright background). This point is identified as a line edge, its position is recorded and the background average light value, in the "compare" location, is also entered into every stack register. Then, additional light level readings of the line are read for different adjustments of the optical elements. For each reading, each successive light value is digitized and pushed into the stack. An average of the data in all of the stack registers is calculated and compared with the value in the "compare" location. If the calculated average is less than the value in the "compare" location, the former replaces the latter and the line is read again for another optical adjustment. If the average light value in the stack is more than the value in the "compare" location, the line is read five more times for five different optical adjustments. If the value keeps increasing, the value currently in the "compare" location represents the value most different from the background value. This value corresponds to the "best" current focus adjustment for the line.

The master document is placed into registration with a fixed set of reference axes by finding two, or more, points on the edges of each of two, or more, lines which should be coincident with, or parallel to, corresponding ones of the axes. The position of each such point on a line is compared with the position of a point on the corresponding line and the correction signals are sent to drives which adjust the master document's position to bring its lines into alignment with the reference axes.

The optical magnification may be determined and adjusted by finding edges of, for example, two parallel lines on the document. The relationship of the apparent difference between the positions of the two edges and a preselected quantity representing the difference for a desired magnification indicates the accuracy of magnification. Correction signals may be sent to drives for adjusting the optical elements until the apparent difference between the position of the two line edges gives the desired magnification. The optical elements are then adjusted a small amount and the entire line scan operation is repeated. After a plurality of repetitions, the best current focus values are examined and an optimum focus value is selected. The optical elements are then adjusted to the position which gave this value.

The foregoing and other objects, features and advantages of the invention will be apparent from the following more particular description of preferred embodiments of the invention, as illustrated in the accompanying drawings.

GENERAL DESCRIPTION—FIGS. 1A AND 1B

Figure 1A:
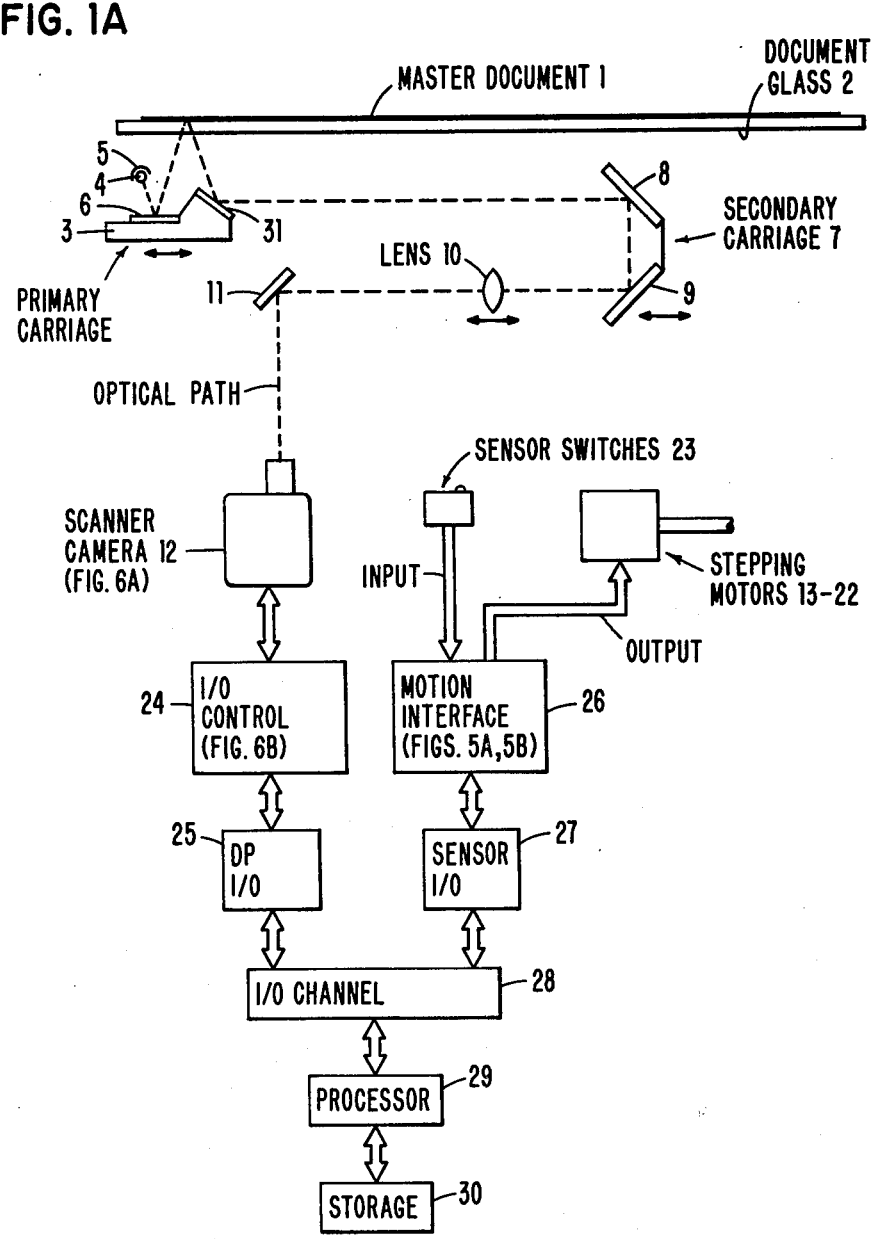
FIG. 1A is a schematic representation of a copier incorporating the invention.

Referring first to FIG. 1A, there is shown a master document 1 mounted on a document glass 2 carrying lines in juxtaposition with the document glass so that light may pass through the document glass 2 to the lines on the master document 1 which may be a transparent, translucent or opaque sheet. A movable primary carriage 3 carries a light source 4 which emits light reflected from a reflector 5 and a mirror 6 onto the master document 1 as the primary carriage moves in the direction shown. The light is reflected from the master document to another mirror 31 carried on the primary carriage 3 and then to mirrors 8 and 9 on a secondary carriage 7 movable in the directions shown. The light reflected from the mirror 9 passes through a lens 10 and then is reflected from a mirror 11 which is in fixed relationship to a scanner camera 12. The scanner camera 12 is capable of scanning an image of an area on the master document 1 made available to its optical input as a result of the light scanned onto the master document from the lamp 4. The limited area made available to the scanner 12 is "dissected" by the electronic circuitry associated with the scanner 12 and digitized so that, at an electronic output from the scanner 12, there is available digital data representing light values sequentially scanned by the scanner camera 12 in the area determined by the light 4.

Stepping motors 13-22 are provided to move the document glass, the carriages 3 and 7, the lens 10 and the scanner camera 12. Sensor switches 23 are provided at various points to sense the limits of motion of the mechanical elements associated with the system. The stepping motors 13-22 and the sensor switches 23 interact to provide predetermined areas of examination to the scanner camera 12 so that digital data is available indicating light values on areas of the master document 1 necessary to operation of the invention.

The digital data available from the scanner camera 12 is interpreted by input/output controls 24 and 25 which are connected via an input/output channel 28 to a processor 29 having a storage 30. Signals essential for the scanner camera 12 to operate in accordance with the necessary scanning commands are provided to the input/output control 24 from the processor 29 in accordance with a logical sequence partially recorded in the storage 30. The necessary movements of the master document 1 and the associated optical elements, for example primary carriage 3, secondary carriage 7 and lens 10, are accomplished by commands from the processor transferred to the stepping motors 13-22 by way of sensor input/output circuits 27 and motion interface circuits 26.

Figure 1B:
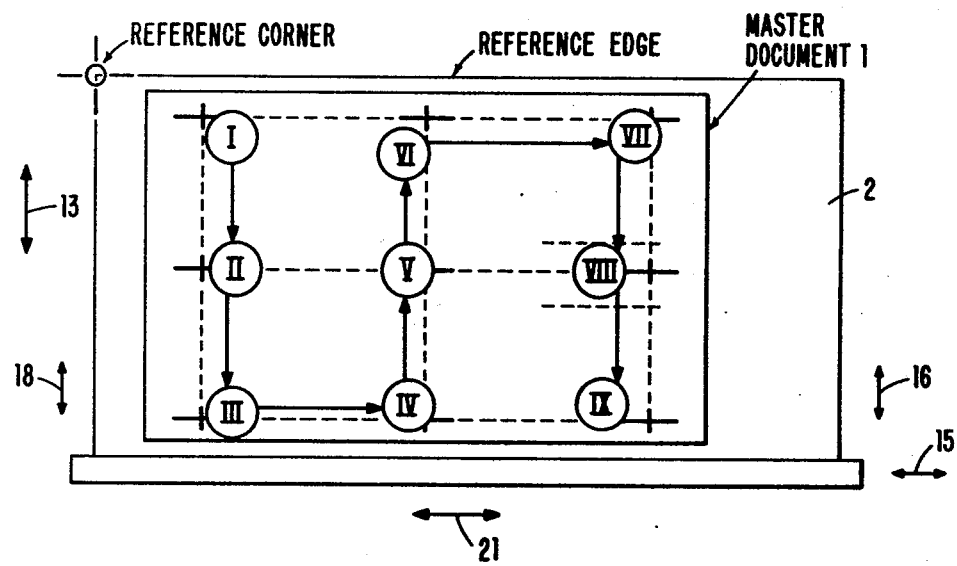
FIG. 1B is a plan view of the master document of FIG. 1A.
Figure 6C:
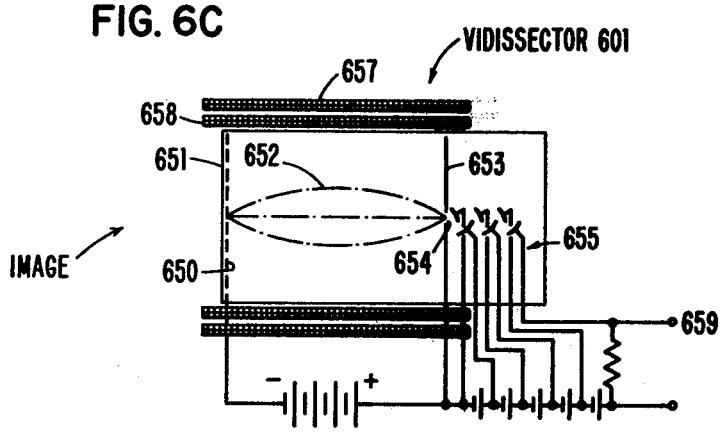
FIG. 6C is a cross-sectional schematic view of an image dissector tube.
Figure 6D:
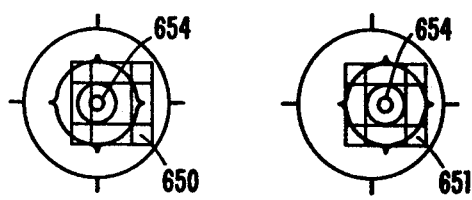
FIG. 6D is a diagram illustrating an image on the tube of FIG. 6C.

The general configuration and operation of the appparatus incorporating the invention will be understood by reference to FIG. 1B, which is a plan view of the master document 1, illustrating the areas I-IX made available to the scanner camera 12 for scanning operations. Areas I-IX are arranged into columns (for example I, VI, VII) and rows (for example I, II, III). The master document 1 is illustrated as mounted on the document glass 2 which is viewed from the side from which light is scanned. The scanning camera 12 is moved in desired directions by stepping motors to position different columns on the document 1 relative to the camera 12. A primary carriage 3 is moved by a motor 21 to position different rows on the document 1 relative to the camera 12. As the motors 13 and 21 are stepped, they move the primary carriage 3 and the scanner camera 12 to make available to the camera 12 selected areas I-IX on the master document 1 one at a time. A reference edge and a reference corner are provided for the document glass 2 to initialize its position and provide reference information for proper alignment. Initially, area I is brought into the imaging area of the scanner camera 12. When operations are completed in the area I, motor 13 causes the scanner camera 12 to move to bring area II into its field of operation. Similarly, motor 13 causes field III to be examined by the camera 12. Movement from area III to area IV is accomplished by moving the primary carriage 3 via motor 21. Subsequently, areas V and VI are reached by movement of the camera 12 by motor 13. Area VII is reached by moving the primary carriage 3, and areas VIII and IX are reached by movement of the camera 12.

Still referring to FIG. 1B, there are provided on the master document 1 a number of lines which fall within the areas I-IX. For example, a line (column), shown dashed for illustration, falls within the area I. When the area I is made available to the camera 12, the camera 12 electronically scans area I until the vertical line is found. The position, that is the coordinates, of the point at which the line was found is recorded as digital data by the processor 29. Prior to finding the line, the light values of the background, that is the non-line area, of the master document 1 are also recorded by the processor 29. Once the vertical line in the area I is found, the line itself is repeatedly scanned and the light values for each scan are recorded by the processor 29. The optical elements, for example secondary carriage 7, are adjusted for each scan so that the light values recorded by the processor 29 will be a function of the position of the optical elements. Utilizing the observation that the line will appear to be darker when it is in focus than when it is not in focus, the light values recorded will be indicative of the apparent degree of focus of the vertical line in the area I for each different optical element position. The processor 29 will monitor the light values, attempting to identify any light value that is less than the previous light value. Thus, there will be recorded, for each line, a light value that indicates "improved" focus. That is, improving focus causes the line to appear to get darker relative to the previously recorded background. When light values increase, (get brighter), the optical element adjustments may either be causing the system to leave the point of "best focus" or there may be a temporary perturbation in the system. The condition involved is identified by continuing to take readings during subsequent scans and adjustments of the lens system. If the light values continue increasing thereafter, it is assumed that the point of best focus has been passed, and the value recorded for that point is then used. However, if the light values again decrease, it is assumed that there was a temporary perturbation and the lower values continue to be recorded as before until there again is an increase in light values. In this way, a value is recorded for the "darkest" light value of the vertical line in the area I during repeated adjustment of the optical elements. The adjustments of the optical elements are also recorded so that when operations within the area I are completed, there is recorded, as a minimum, the position of the vertical line and the adjustments of the optical system which gave the "best" focus for that vertical line.

When the scanner camera 12 is moved by the motor 13 to examine the area II, another line is examined, as shown, in exactly in the same manner as just described. Similarly, lines in areas III-IX are examined and the positions of the lines are recorded, as are the adjustments of the optical system to obtain the darkest, that is best focus, for each line. The positions of the optical elements for the "best focus" at each of the nine areas I-IX are then averaged together to give the optical adjustment for an otimum focus. It will be noted that this optimum focus adjustment is not necessarily the same as the "best focus" for any one of the nine areas. However, as an alternative, statistical techniques may be used to identify a statistically "best focus" which may be superior to the average.

Once the position of the optical elements for the optimum focus is determined, the optical elements, for example carriage 7, are moved to that position and necessary physical adjustments are made to ensure that they will be fixed in that position during normal operation.

The camera 12 is then moved by motor 13 back to area VIII where there are two additional lines spaced a known distance apart. The area VIII is again scanned; this time, however, while looking for the two lines in turn. When one of the lines is found, its coordinates are recorded and the second line is searched for. When the second line is found, its coordinates (representing the apparent spacing of the two lines) are recorded. The difference between the coordinates, calculated by the processor 29, is a function of the magnification of the optical system and is adjustable by moving the lens 10. The processor 29 supplies signals necessary to step motor 17 the necessary amount to adjust the magnification of the optical system to bring the apparent spacing between the lines in the area VIII to the amount necessary for a predetermined amount of magnification.

The motor 13 then steps the camera to area VII to again bring the upper line into the image area of the camera 12. The area VII is used a second time, in conjunction with area I, to ensure that the document glass 2 is properly aligned. This is accomplished by finding the top line in area VII and recording its position. Then the primary carriage 3 is moved by motor 21 to bring the top line in area I into the camera 12 image area. The camera 12 scans for the top line and records its position when found. The difference between the coordinates of the top line in area VII and area I is an indication of the skew, or lack of alignment, of the document glass 2. The skew is corrected by rotating a reference edge about a reference corner under the control of motors 15, 16 and 18 until the coordinates of the horizontal line as detected in areas VII and I are identical.

Figure 2:
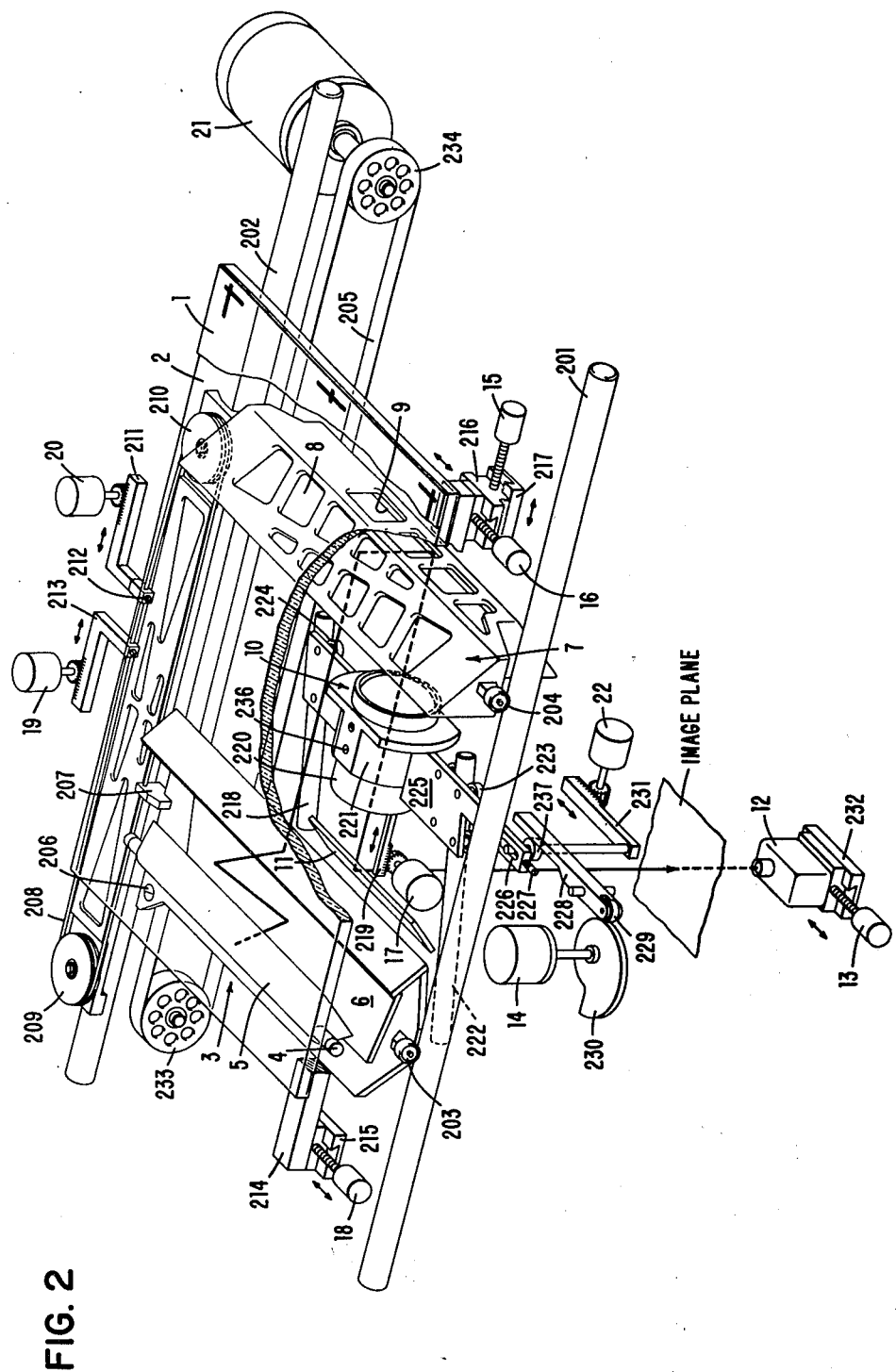
FIG. 2 is a three-dimensional view of the copier optical system.
Figure 3:
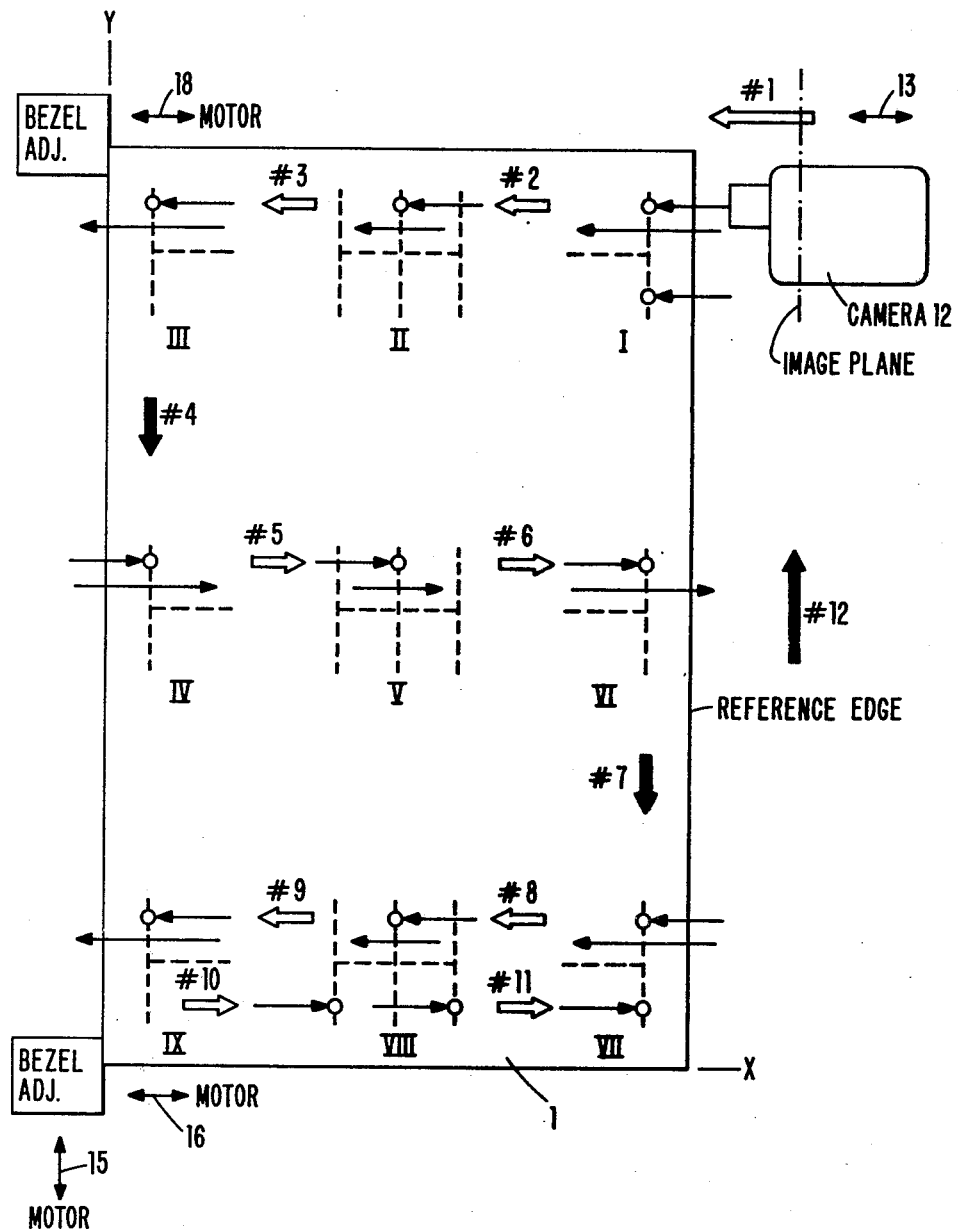
FIG. 3 illustrates scanning of a test pattern on a master document.

Optical System—FIGS. 2 and 3

Referring now to FIG. 2, an optical system for an electrophotographic apparatus, herein called a "copier", such as a copier, information distributor, facsimile terminal, printer, etc., is shown. The purpose of the system is to scan a "footprint" of light from the lamp 4 across a document, for example a test pattern 1, placed on the document glass 2. In equivalent systems (for example flash, laser, etc. illumination), the scanning technique is replaced by other illumination devices or by direct deposition (such as ink jet). In the particular optical sytem shown, the image may be reduced in accordance with the setting of the lens assembly 10, but image enlargement is alternatively possible. For purposes of achieving proper initial adjustment of the optical system during the manufacturing process, several additional elements are provided, and several additional adjustments which are fixed in normal operation are available for manual adjustment. Most important, the normal position of the photoconductor (in a plain-paper copier—in a coated-paper copier, a non-photo-conductive paper support surface is the equivalent) is replaced with the scanner camera 12 focused on the image plane normally occupied by the photoconductor surface. Once the optical elements are adjusted to an optimum series of settings, as seen by the scanner camera 12, replacement of the scanner camera 12 by an optical photoconductor at the image plane examined by the scanner camera 12 will give optimum operation of the electrophotographic apparatus. The particular adjustments made in the apparatus of FIG. 2 are those necessary to achieve the sharpest focus at the image plane, to place the relative positions of the optical elements in a position for a desired amount of reduction and to align the document glass 2 in accordance with a predetermined set of reference axes.

In FIG. 2, there is provided a set of rails 201 and 202 carrying carriages 3 and 7 which are movable on the rails by rotation of wheels 203 and 204. A scan drive strap 205 is placed over pulleys 233 and 234 to drive, under control of scan stepper motor 21, the primary carriage 3. The primary carriage 3 is fastened to the scan drive strap 205 by a fastener 206, and there is additionally provided a clamp 207 which is attached to scan drive cable 208 threaded around pulleys 209 and 210. Thus, when the scan stepper motor 21 drives the primary carriage 3 by means of the scan drive strap 205, motion is also imparted to the scan drive cable 208. The secondary carriage 7 is attached to the frame 235 which carries the pulleys 209 and 210. If the scan drive cable 208 is fixed in position, for example to a bar 211 at setscrew point 212, then the secondary carriage 7 will move as the primary carriage 3 moves. The rate of motion of the secondary carriage 7 relative to the primary carriage 3 is 1:2. A snormal relationship is provided whereby the secondary carriage 7 moves relative to a fixed reference, half the distance that the primary carriage 3 moves, relative to the same fixed reference. The offset of the primary carriage to the secondary carriage, that is the initial spacing at their closest or most distant position, is a function of where point 212 is attached to cable 208. This point is changed in normal operation by moving arm 211 under the control of reduction drive stepper 20. However, during adjustment operations, the set point is not fixed; that is, the setscrew 212 is loose permitting the scan drive cable 208 to slide freely without moving the arm 211. A resolution stepper 19 is temporarily provided to change the fixed position of the scan drive cable by moving the point of connection in accordance with the position of the arm 213. Once a desired relationship between the primary carriage 3 and the secondary carriage 7 is determined, by adjustment of the resolution stepper 19, the setscrew 212 is fixed in position and the resolution stepper 19 is disconnected. It can, therefore, be seen that adjustment of the optical elements can be easily achieved by stepping the resolution stepper motor 19.

The magnification, that is reduction capability, of the optical system can be changed by adjustment of the position of the reduction drive stepper 20 and also requires adjustment of the position of the lens assembly 10. The adjustment of the lens assembly 10 is achieved by moving the lens assembly 10 on rails 218 and 222 under the control of reduction drive motor 14. The reduction drive motor 14 rotates a cam 230 which causes a cam follower 229 to move an arm 228 which, in turn, moves the entire lens assembly 10 by causing plate 225 to slide on the rails 218 and 222 via wheels 223 and 224. The relative position of the lens assembly 10 may be adjusted by sliding the lens 220 inside its barrel 221 in accordance with signals to a magnification motor 17 which drives an arm 219. Once the desired position of the lens assembly 10 is achieved, setscrews 236 must be tightened to fix the lens 220 in the lens barrel 221. Further magnification, that is reduction, adjustments are made by controlling the position of the plate 225 relative to the cam 230. This is achieved by joint operation of the slot 226 and a setscrew 227 provided on the plate 225. A reduction adjustment stepper motor 22 moves arm 231 to place the shaft of the follower wheel 237 in the slot 226 at the desired position. The setscrew 227 is then brought to that point to fix the relationship of the cam 230 and the plate 225. Both the reduction adjustment stepper motor 22 and the magnification motor 17 are provided for purposes of adjustment only.

The document glass 2 is fastened to a bezel clamp 214 which may be positioned, and thus position the document glass, under the control of document glass stepper motors 15, 16 and 18. The stepper motors 15 and 16 emit the control of document glass 2 in two axes. The document glass stepper 15 causes the document glass 2 and also the document glass stepper motor 16 to move relative to a fixed reference as the document glass stepper motor causes a sliding in block 217. Block 216 moves in accordance with operation of document glass stepper 15, and thus, motion in a direction 90° from the direction caused by document glass stepper 15 is caused by operation of document glass stepper 16. Document glass stepper 18 causes motion of the bezel clamp 214 in one direction as the document glass stepper motor 18 causes sliding in block 215.

Referring now to FIG. 3, the patterns on the master document 1 mounted on the document glass are shown in more detail, together with the relative physical motions involved by driving the motors 13-22 shown in FIG. 2. FIG. 2 shows the camera 12 focused on, and movable in, the image plane (that is without changing its position relative to the image plane, by motor 13). The document glass 2 is movable by bezel adjustment stepping motors 15, 16 and 18, movable in the directions shown by the arrows. The master document 1 is divided into three rows, each having three columns. The areas defined by the rows and columns are designated as areas I-IX, numbered in the sequence in which they are examined. The camera is moved by motor 13 to access areas in its row; that is, areas I, II, III are accessed by movement of the camera 12. It is necessary to move at least the carriage 3 under the control of scan stepper motor 21 to bring another row of areas to the camera 12. For example, it is necessary to bring areas IV, V and VI into the view of the camera 12 before the camera 12 can access those areas by movement under the control of motor 13. In FIG. 2, motion of the camera under control of the motor 13 is shown by a white arrow, and motion of the carriages 3 and 7 under control of the motor 21 is shown by a dark arrow. The arrows are numbered: #1, #2, #3, #4, #5, #6, #7, #8, #9, #10, #11, #12 to indicate twelve sequential steps of accessing areas I-IX. For example, in step #1, the camera 12 is driven by the camera motor 13 to access area I. Then, in step #2, the camera 12 is driven by the motor 13 to area II. In step #3, the camera 12 is driven to area III, and in step #4, the carriage 3 is stepped by the motor 21 to bring a new row of areas IV, V and VI into the field of the camera 12. Each area of the master document 1 is examined by electronically scanning the camera 12 for a specified indicia. As is shown in FIG. 2, there are provided a number of lines, illustratively shown as dashed lines, on the master document 1. Depending upon the step of operation, the camera 12 will examine different aspects of the lines. For example, when area I is examined initially, the vertical line is first located, and once it is found, it is scanned twenty-one times for twenty-one different optical element adjustments. Similar operations occur in areas II-IX. Once the last line in area IX is scanned, the tenth step takes the camera 12 back to area VIII where two vertical lines instead of one are located for purposes of determining magnification. Then, in steps #11 and #12, the two segments of the vertical line in areas VII and I are reexamined to determine the difference between the coordinates of their positions for aligning the document glass 2 until the coordinates are substantially the same. The following table summarizes the operations performed upon the master document 1 as shown in FIG. 3:

| Step # | Drive Motor | Area No. | Operation |
|---|---|---|---|
| 1 | Camera 13 | I | Find and Scan |
| 2 | Camera 13 | II | Find and Scan |
| 3 | Camera 13 | III | Find and Scan |
| 4 | Carriage 21 | IV | Find and Scan |
| 5 | Camera 13 | V | Find and Scan |
| 6 | Camera 13 | VI | Find and Scan |
| 7 | Carriage 21 | VII | Find and Scan |
| 8 | Camera 13 | VIII | Find and Scan |
| 9 | Camera 13 | IX | Find and Scan |
| 10 | Camera 13 | VIII | Find and Find |
| 11 | Camera 13 | VII | Find |
| 12 | Carriage 21 | I | Find |

Figure 4:
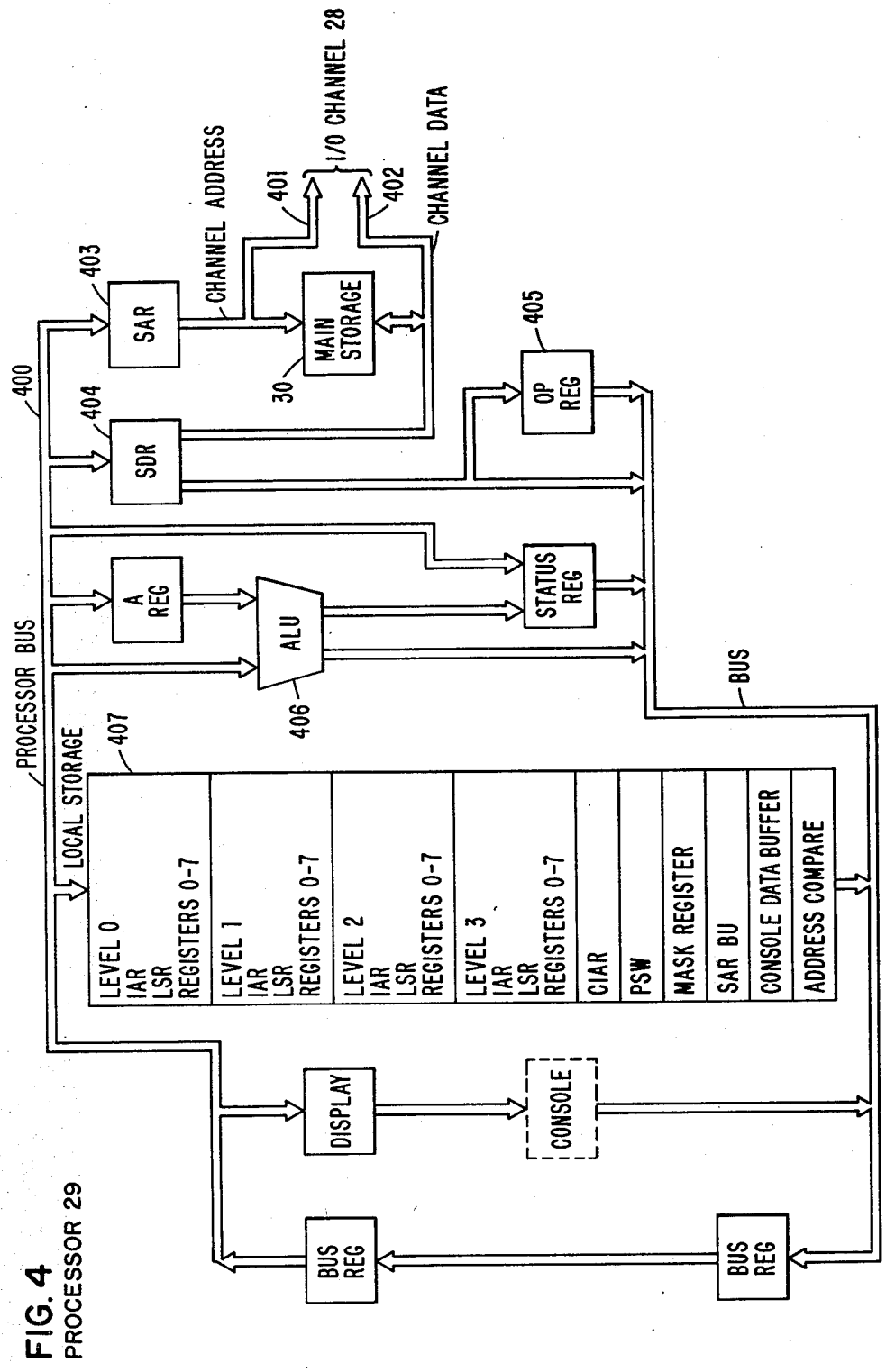
FIG. 4 is a block diagram of a minicomputer.

Control Circuits—FIGS. 4 and 5

Referring now to FIG. 4, there is shown a generalized block diagram of a commercially available processor which may be utilized as the processor 29 in FIG. 1A. The particular processor utilized has associated with it input/output channel and storage circuits 28 and 30 and special circuits for dealing with electrical signals from external sources. For purposes of illustration, FIG. 4 shows a processor 29 marketed by the International Business Machines Corporation as the IBM Series/1, Model 3, 4953 Processor. It will be understood that a detailed description of this processor is not necessary because the information is generally available. A description of the 4953 Processor is found in a publication entitled "4953 Processor Description", Form No. GA34-0022-2, Third Edition, dated Nov., 1977, and published by the International Business Machines Corporation. It will be understood that other processors may be substituted for the processor disclosed herein without affecting the operation of the invention. Another processor usable in the invention is disclosed in U.S. Pat. No. 4,086,658, filed Oct. 4, 1976, by D. E. Finlay, assigned to the International Business Machines Corporation.

Central to the processor 29 shown in FIG. 4 is a processor bus 400 in which are connected all the operational registers and other elements necessary to the operation of a processor. Information is transferred to and from external sources via an input/output channel 28 connected to the procesor 29 by a channel address bus 401 and a channel data bus 402. The storage 30 is attached to the channel buses 401 and 402 in the embodiment shown. The information in the form of digiatl data representations supplied to the input/output channel is placed on the channel address and channel data buses 401 and 402 and placed into storage and operated upon the processor 29 in accordance with programs of instructions stored in the main storage 30 and interpreted by facilities in the processor 29. Similarly, results of operations within the processor 29 are transferred to the input/output channel 28 via the address and data buses 401 and 402 under the control of programs of instructions stored in the main storage 30. Locations in the main storage 30 are addressed by digital representations of storage addresses placed into the storage address register 403. The data at the locations specified by the storage address register 403 is placed in storage data register 404. When the data in the storage data register 404 represents instruction information, as opposed to data, the instructions are interpreted by circuitry connected to the operation register 405. Data is manipulated in an arithmetic and logic unit 406 in accordance with the interpreted instructions. A local storage 407 is provided for a large number of specialized registers, counters, and control devices. Additional registers and facilities are utilized within the processor 29 to enable the transfer of information on the buses 401 and 402 in accordance with operations specified by programs of instructions in the main storage 30. An assembly language listing of a program of instructions for configuring the control circuits to operate in accordance with the invention is incorporated herein. The comments included in the listing are self-explanatory.

Figure 5A:
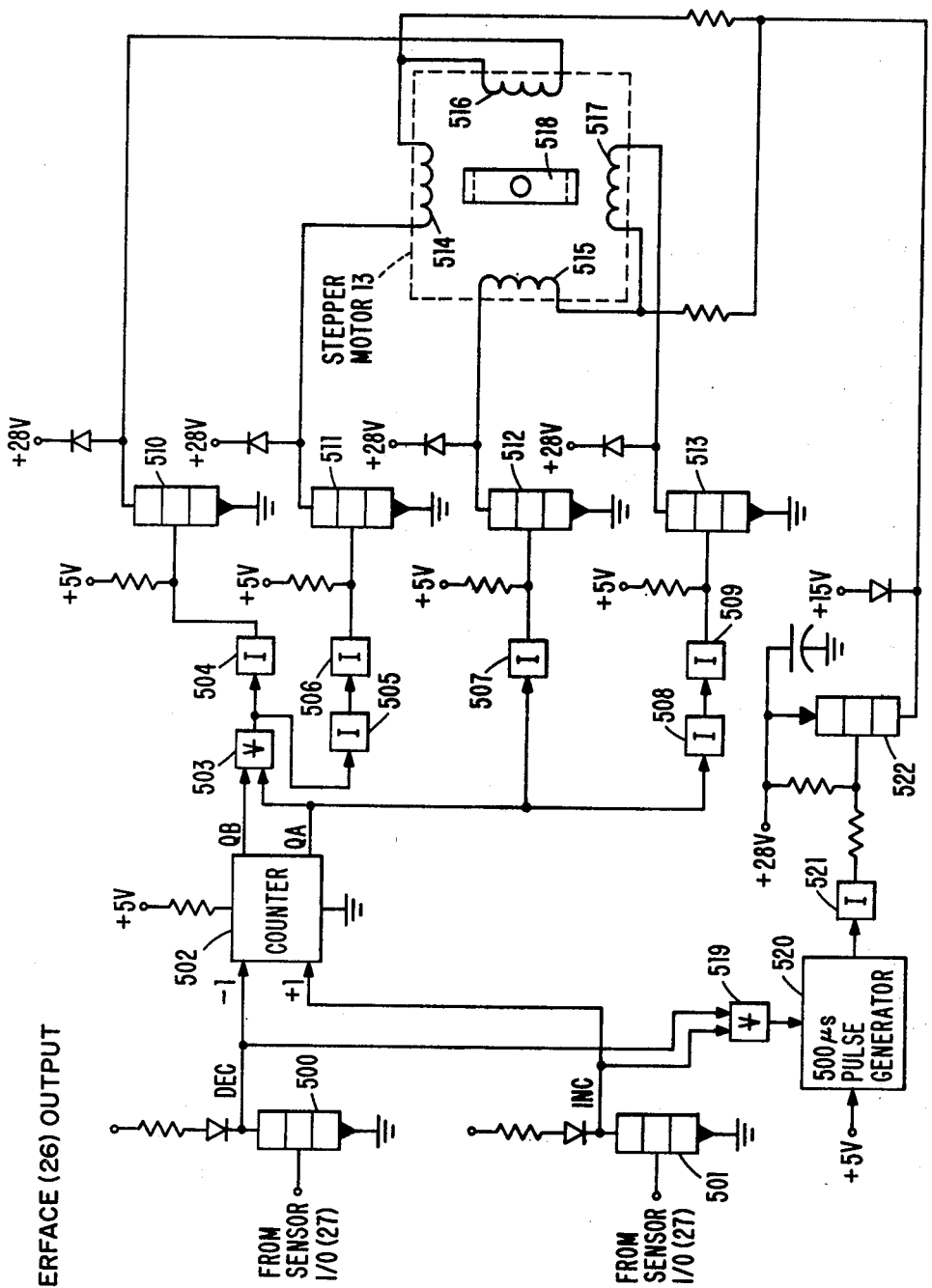
FIG. 5A is a schematic diagram of a minicomputer output circuit for driving a motor.

Operations involving external devices, such as the operation of stepper motors and the sensing of signals from switches, are performed by sensor input/output circuits normally associated with the processor 29 and described in a publication entitled "IBM Series/1 4982 Sensor Input/Output Unit Description", Form No. GA34-0027-2, Third Edition, dated June, 1978, published by International Business Machines Corporation. Referring to FIG. 5A, there is shown a circuit for interconnecting digital data representations from the sensor input/output circuits 27 to the stepper motors 13-22. For purposes of economy, the operation of only one stepper motor 13 is illustrated in FIG. 5A. One series of digital signals from the sensor input/output circuit 27 is used to decrement, that is step downward, the stepper motor 13, and another set of digital representations is used to increment, that is step in the other direction, the stepper motor 13. The decrement and increment signals from the sensor input/output circuit 27 are supplied through drive transistors 500 and 501 to a counter 502. The counter 502 may be stepped in either direction, but the exclusive OR circuit 503 guarantees that there will be a signal to drive transistors 510-513 only if it is stepped in one direction and not if it is stepped simultaneously in both directions. The counter 502 outputs QA and QB are inverse outputs, and together with inverters 504, 509 provide signals to the field coils 514-517 of stepper motor 13 necessary to rotate the rotor 518 one increment in one direction for each digital pulse from sensor input/output 27 placed into transistor 500 and in the other direction for every digital representation entering transistor 501. The incrementing is accomplished by utilizing transistors 510-513 to appropriately switch the coils 514-517 in anticipation of an increment pulse received from the pulse generator 520 when a signal is received at either of the counter 502 inputs. The pulse generator 520 supplies a five hundred micorsecond pulse through an inverter 521 and drive transistor 522 to appropriately step the stepper motor 13, rotor 518.

Figure 5B:
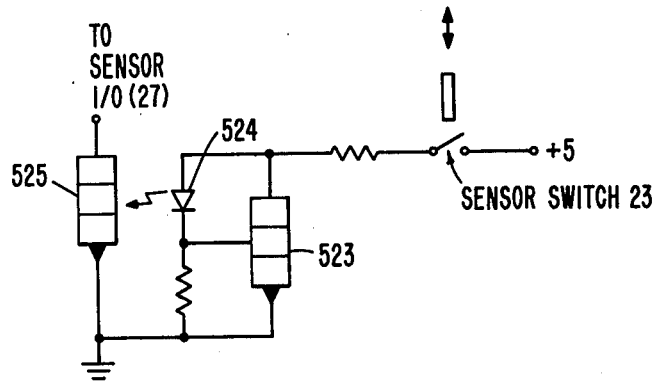
FIG. 5B is a schematic diagram of a minicomputer input circuit operated by a switch.

Referring to FIG. 5B, an example of the connection of a sensor switch 23 to the sensor input/output circuit 27 is illustrated. The purpose of the circuit shown in FIG. 5B is to isolate the circuits in the sensor input/output 27 from the potential source +5 when the sensor switch 23 is closed. This is accomplished by illuminating the light emitting diode 524 connected across the transistor 523 to activate the transistor 525 when transistor 525 detects the occurrence of light from the emitter 524. The transistor 525 is light sensitive.

Camera Cirsuits—FIGS. 6A-6D

Referring now to FIGS. 6A-6D, an input/output control 24 and scanner camera 12 usable with the invention will be described. The camera is an ITT Model F5019 camera utilizing an ITT Model F4100 vidissector camera tube. The camera tube is mounted in the camera which is, in turn, connected to an input/output control which is operable to control the scanning of areas viewed by the camera tube and to supply, at an output connected to an input/output channel 28 by way of a data processsing input/output connection 25, signals indicating the coordinates of the positions scanned and digital data representing the light value of the points scanned. The vidissector tube is a camera tube receiving an image on a photosensitive cathode which is scanned in accordance with magnetic fields to place the apparent image at different positions on a fixed scanning aperture. As shown in more detail in FIG. 6C, an image entering the vidissector tube 601 appears in a plane 650 on one side of a translucent photosensitive cathode 651. Deflection coils 657 and 658 control the position of the image from the cathode 651 to the aperture 654 such that only the desired point of that image is projected through the aperture 654. The aperture 654 has a fixed opening across which is scanned the entire image, one point at a time. The amount of light on the aperture 654 determine the magnitude of the electron beam impinging through the aperture at the time a particular point is scanned. Electron multiplier elements 655 amplify the signal to supply at an output 659 at the anode 653 a series of electrical pulses representing the light values at sequentially scanned points on the image 650.

Referring again to FIG. 6A, the focus coil 658 is driven by focus current regulator source 604, and the deflection coils 657 are driven by deflection amplifiers 605. A video coupler 606 couples the high voltage vidissector 601 anode current to a video preamplifier 607 via line 659. A power supply 611 is connected to a high voltage power supply 610 which in turn drives the vidissector 601 through a voltage divider 608. Dynamic focusing is achieved by dynamic focusing circuits 609 which allow the vidissector 601 tube to have adjusted its photocathode voltage. In operation, the scanner camera 12 receives deflection signals for the X and Y directions at its deflection amplifier 605 so that magnetic fields are generated by the deflection yoke 657 to cause the vidissector tube 601 to scan the image 650 and supply video signals corresponding to the light values on the image at the video output of video preamplifier 607.

Figure 6A:
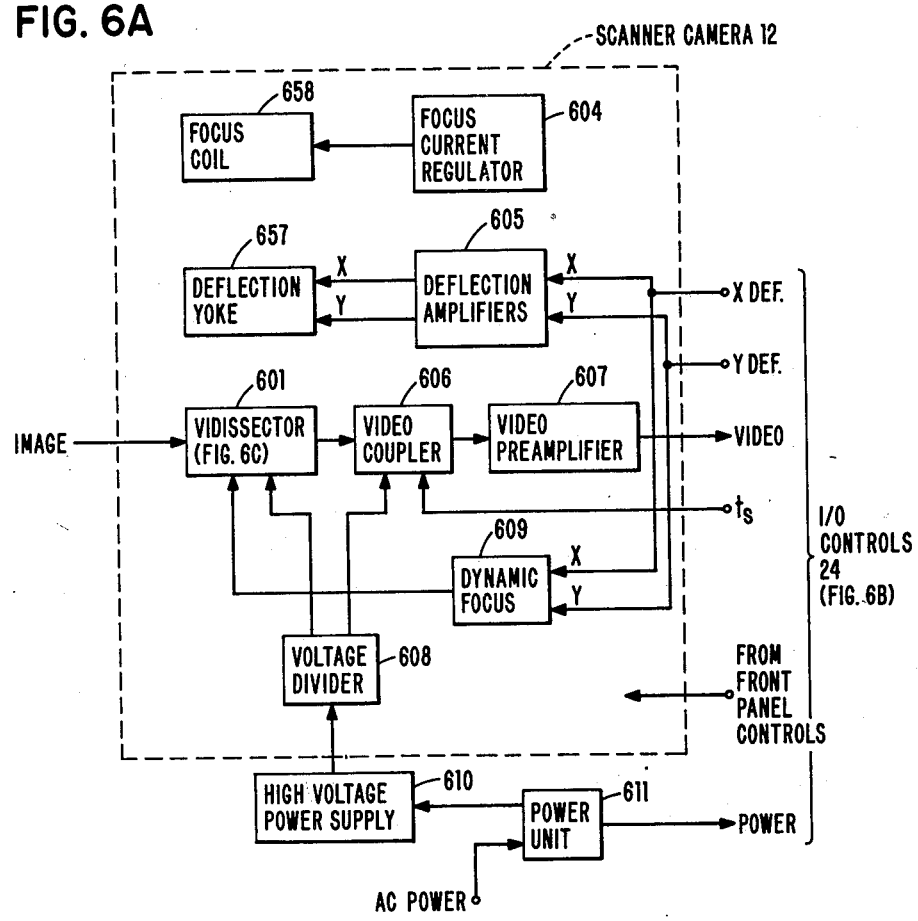
FIG. 6A is a block diagram of an image dissector camera unit.
Figure 6B:
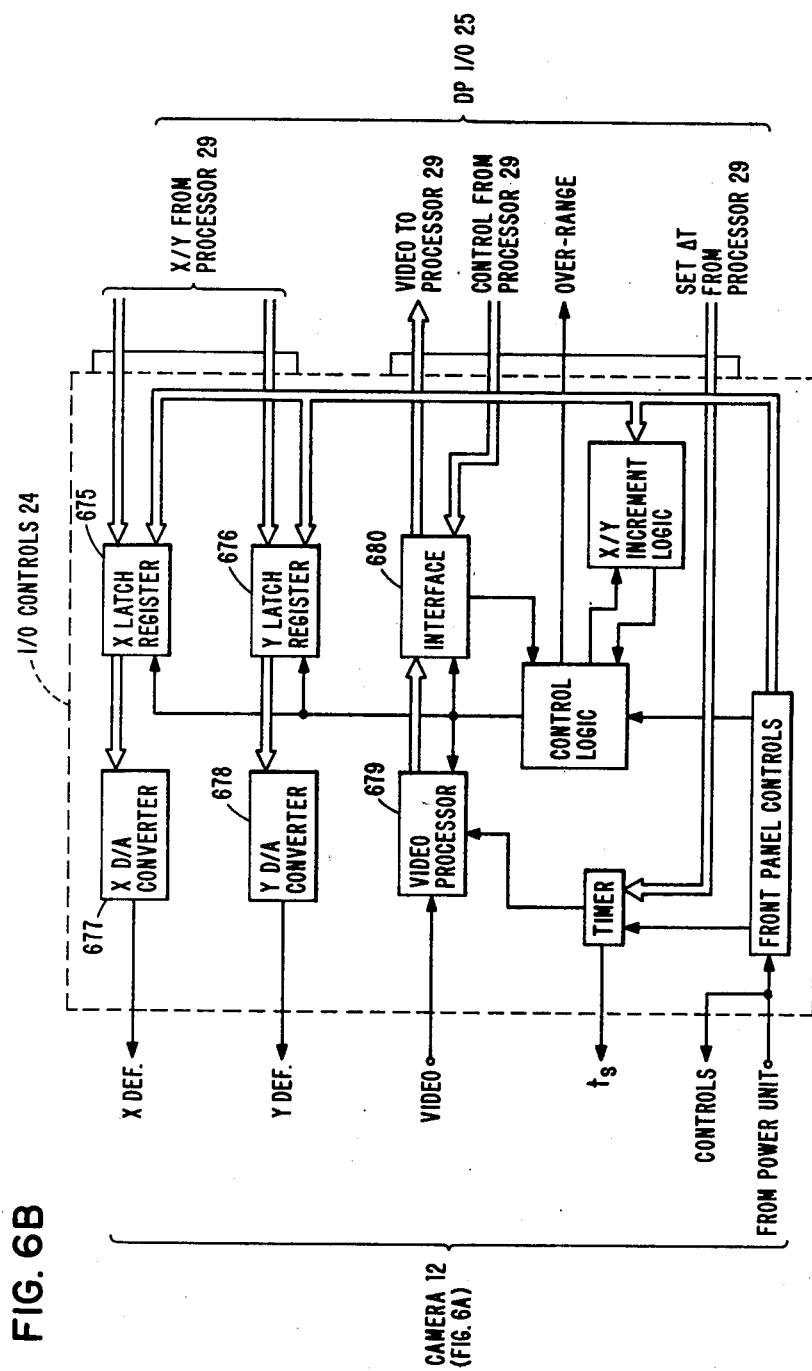
FIG. 6B is a block diagram of an image dissector camera control unit.

Referring to FIG. 6B, there is shown input/output control circuitry 24 which supplies the X and Y deflection signals and receives the video information from the scanner camera 12. The input/output control circuit 24 connects to the data procesing input circuit 25 which is connected to the processor 29 by way of the input/output channel 28. It functions to convert to deflection signals usable by the scanner camera 12 digital data received from the processor 29. Similarly, it supplies to the processor 29 digital data representations of the video signals which are a function of the light values of the image. The processor 29 supplies to the input/output control 24 digital data words (twenty-eight bits each) representing X and Y coordinates at which the electron beam of the vidissector camera tube 601 is to focus a point. The X and Y latch registers 675 and 676 hold this information until digital-to-analog converters 677 and 678 can supply analog signals corresponding to the digital information held in the latches 675 and 676. Video information in the form of analog signals from the camera tube 601 is supplied to the video processor 679, which samples the signals and converts them to digital data representations which are converted to appropriate voltage levels usable by the processor 29 in the interface circuits 680.

Operation—FIGS. 3, 7, 8A-8C

Figure 7:
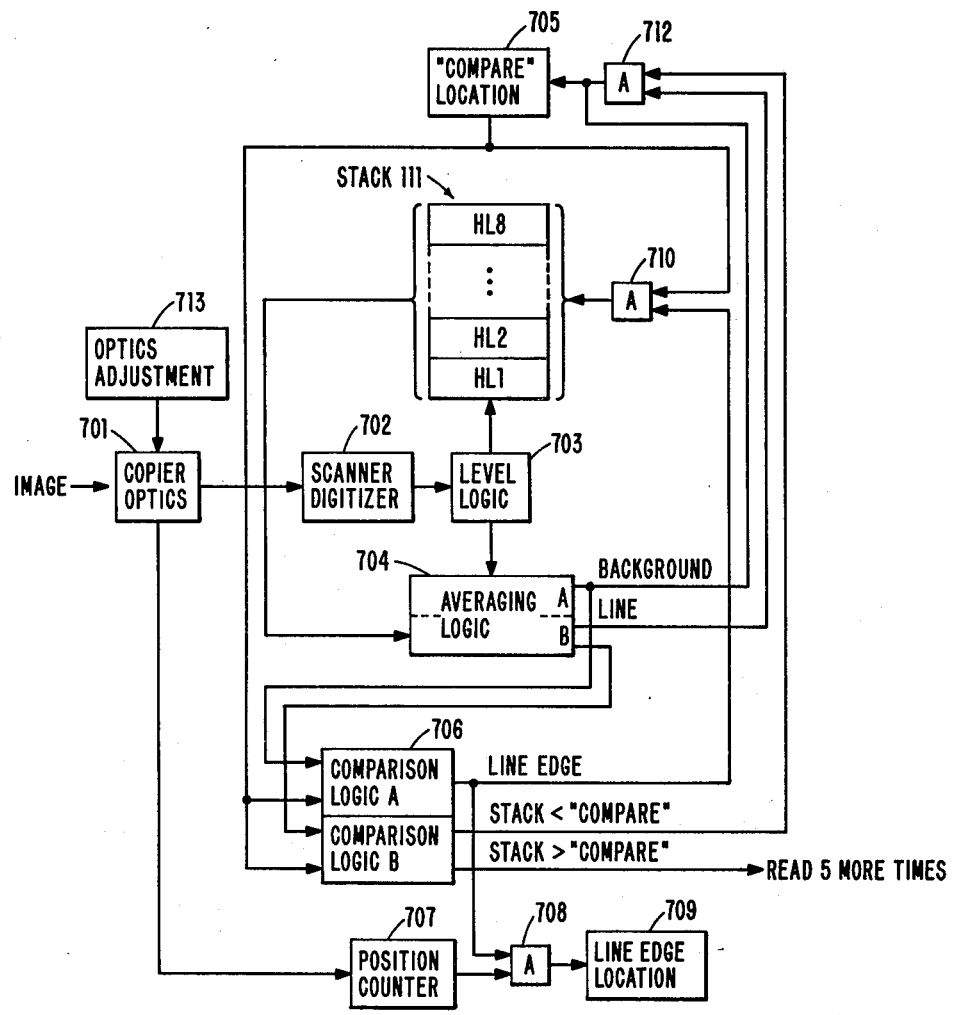
FIG. 7 is a block diagram illustrating operation of the invention.

The operation of the invention will now be described with reference to FIGS. 3, 7, 8A-8C in particular. Referring first to FIG. 7, there is shown a block diagram useful in illustrating operations performed in the processor 29. The copier optics elements, for example the elements 1-12 shown in FIG. 1A, are enclosed within the copier optics block 701, and the electronic scanner digitizing circuits, for example those shown as elements 12, 24, 25, 28 in FIG. 1A, appear as scanner digitizer block 702. Blocks 703-713 illustrate areas within the input/output channel 28, processor 29 and storage 30 of FIG. 1A. Adjustments to the optics in FIG. 1A achieved there by stepping motors 13-22, motion interface 26 and sensor input/output circuit 27 are illustrated by the line labeled "optics adjustment 714".

The operation of the invention will be described in sections based on FIG. 3: finding a line, scanning a line, checking magnification and aligning the document glass.

Finding a Line

Referring to FIG. 3, in each of areas I-IX, there is an operation initially performed to find the location of a line and note its position. This is accomplished by moving the camera 12 under control of motor 13, and carriage 3 under control of motor 21, to an area and initiating an electronic scan of that area. Referring to the flow diagram of FIG. 8A, the camera 12 is reset to a home (area I) position and a line edge "find" operation commenced. Referring to FIG. 7, the image in the copier optics 701 is digitized point by point by the circuitry 702. Data representing the light level of every point on the image area presented to the camera 12 is digitally represented to level logic 703. As points on the document 1 are scanned, background light levels will, initially, be digitized. At least tne background light level readings are taken, averaged in averaging logic 704 and stored in a "compare" location 705. Comparison logic 706 compares the average background light value in the "compare" location 705 with the average of subsequent light values and updates the "compare" location to contain the current average. When the comparison logic 706 detects an averaging logic 704 output significantly less than the value in the "compare" location (for example 80% of the background value), a signal indicating that a line edge has been sensed is supplied. A position counter 707 is stepped to indicate the coordinates of every point scanned by the scanner digitizer 702 on the master document 1. When the comparison logic 706 indicates that a line edge has been sensed, the current position count in the position counter 707 is gated by AND circuit 708 into a line edge location register 709. The comparison logic 706 causes the average background level in the "compare" location to be gated by AND circuit 710 into a stack 711 consisting of positions HL1-HL8. This stack 711 is known either as a "push-up" or "push-down" stack, meaning that it operates on the principle of last-in/first-out. The actual operation of the stack 711 need not necessarily correspond to this description. For example, it may be accessed by a pointer digit maintained in a pointer register which accesses one of registers HL1-HL8 after another, without necessarily causing transfers of data among any of the registers HL1-HL8.

Scan Line

Figure 8A:
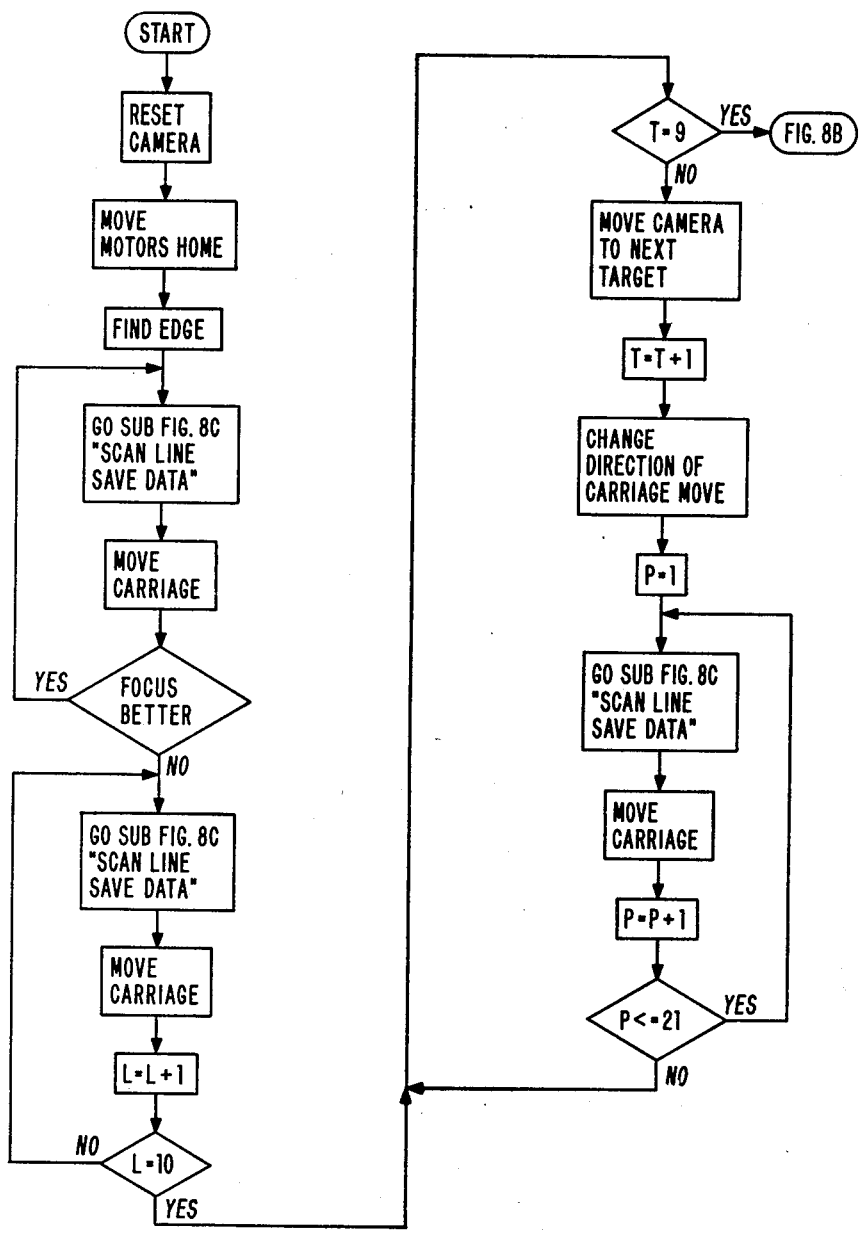
FIGS. 8A–8C are flow diagrams illustrating operation of the invention.

Once the edge of a line within an area is located, the scanning operation will repeatedly cause the copier optics 701 to be adjusted, thus changing its focus, while simultaneously causing the scanner digitizer 702 to examine the line for contrast between the darkness of the line and the brightness of the background. The relative contrast may be reversed by providing a dark background and a light line and looking for the brightest image on the line. IN FIGS. 8A and 8C, a "scan line, save data" operation is performed to calculate an average background light value, load it into the stack, read line light values, enter them into the stack, compare the stack average to the calculated background value and recognize when the darkest line light value has been detected. Initially, when the line edge is detected, the average background light value in "compare" location 705 is placed into each of the stack 711 registers HL1-HL8. As subsequent points (on the line) are read, the corresponding digital values from the level logic 703 are pushed into the stack 711 register HL1 and the stack (or its pointer) is advanced. The digital values inthe stack 711 registers HL1-HL8 are averaged in averaging logic 704 and compared to the "compare" location 705 value by comparison logic 706. If the average of the values in the stack 711 is less than the value in the "compare" location 705, the average value from the averaging logic 704 replaces the previous value in the "compare" location. This is achieved by gating of AND circuit 712 by comparison logic 706. The next point is then read. When averaging logic 704 detects that the current average of the light levels is equal to or more than the contents of the "compare" location 705, the comparison logic 706 causes five more readings to be taken. If the additional readings give another light level average lower than the value in the "compare" location 705, that lower average is entered into the "compare" location and readings are continued as before. However, if all subsequent readings give greater average light values, it is assumed that lowest light level had occurred, and that light level (stored in the "compare" location 705) is used together with indicia of optics adjustment 713 which corresponds to that light level. That is, the condition of best focus is assumed to occur at the point at which the line appears to be darkest with respect to the background.

Figure 8B:
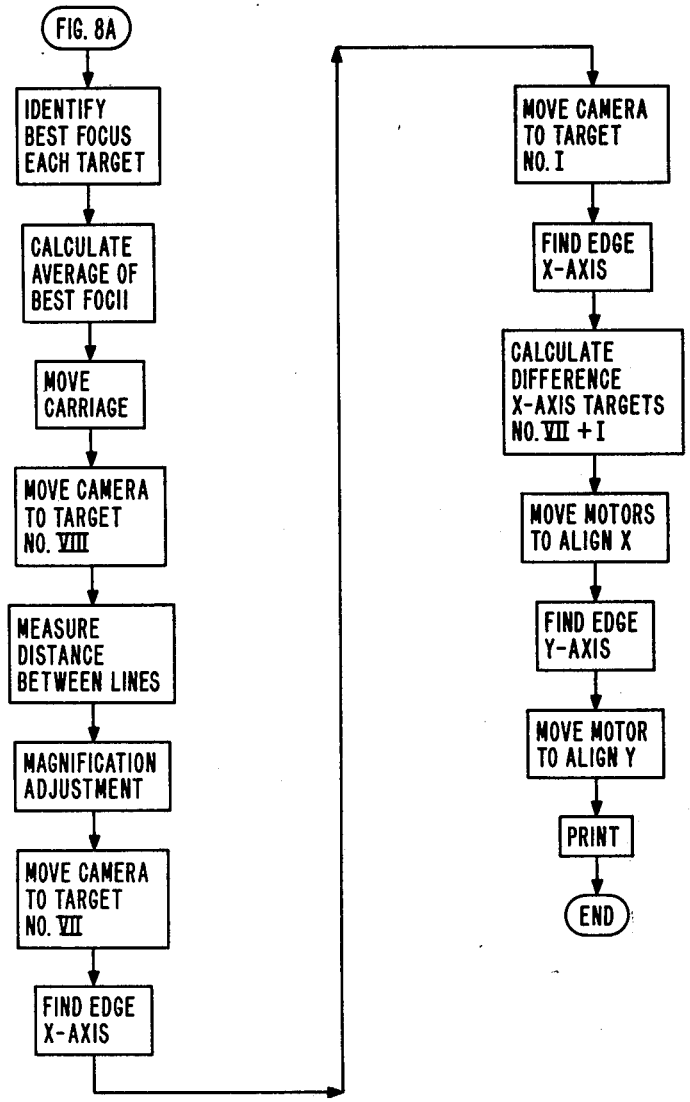
Figure 8C:
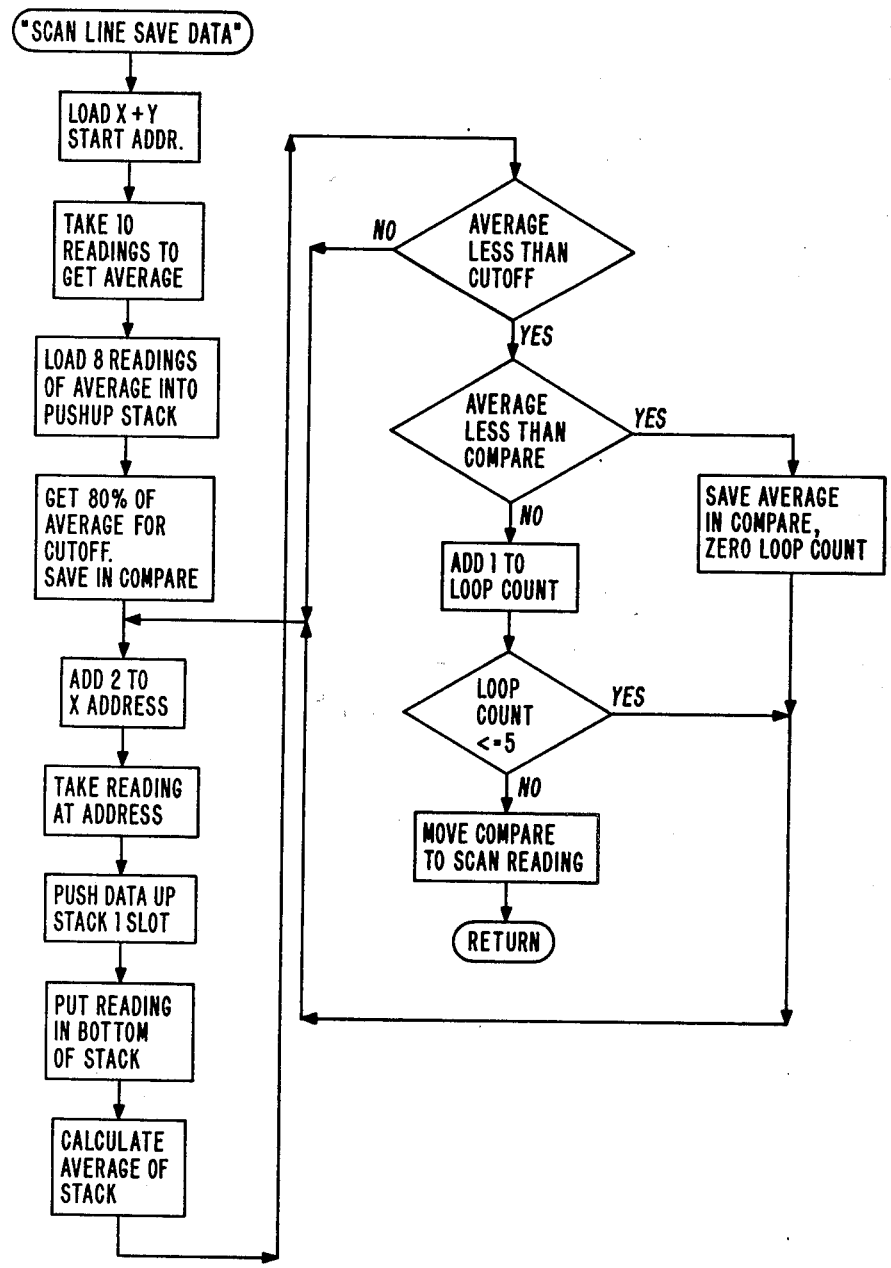

In FIGS. 8A and 8B, the "find" and "scan" operations are repeated for each area I-IX. Then the optimum focus is calculated, the optics are adjusted to give this focus, and area VIII is examined again.

Magnification Check

When the area VIII in FIG. 3 is scanned a second time, two successive find operations are repeated for the two outside vertical lines in area VIII. The operations are identical to those described except that the position counter 707 supplies two sets of coordinates to the line edge location 709, one for each line. The processor 29 thereafter calculates the difference between the positions and relates it to the desired magnification. For example, if the apparent distance between the edges of the two lines is greater than desired, the magnification is too large and must be reduced by appropriate adjustment 713 of the optics 701. In FIGS. 8A and 8B, areas VII and I are next examined again.

Documnet Glass Adjustment

The examination of areas VII and I in FIG. 3 involves the examination of the coordinates of segments of a single vertical line. If the document glass 2 is properly adjusted, the horizontal coordinates will be identical. As described previously, the line edge for each of the areas is determined and stored in the line edge location 709. If there is a difference between the data resulting from the examination of the single line in areas VII and I, appropriate adjustments via the optics adjustment 713 are made to the copier optics 701 until the line segments fall within one line, indicating that the document glass 2 is properly aligned.

While the invention has been particularly shown and described with reference to preferred embodiments thereof, it will be understood by those skilled in the art that various changes in form and details may be made therein without departing from the spirit and scope of the invention.

What is claimed is:

1. An apparatus for optimumly adjusting the optical elements of a copier to positions forming images of lines, on an illuminated background, which have the greatest background-to-line illumination contrast; including an electronic scanner for examining, at different optical adjustments, point-by-point, target line and background images and generating at an output signals identifying the amount of light reflected at each point; wherein the invention is characterized by means for indicating the adjustment at which there is greatest contrast, comprising:
   stack means, connected to the electronic scanner output for retaining, in each of a plurality of positions, one of the light level representations;
   first means interconnecting the scanner and stack means for sequentially entering into the same one of said positions the light level representations at each current target point as the scanner repeatedly progresses across a target line and causing the contents of each position to be placed into an adjacent position;
   a storage register for retaining background light level representations;
   comparison means, connected to the stack storage register and scanner, for comparing background light level representation in the storage register with the average of the representations in all of the stack positions and supplying at an output a first comparison signal if average is less than the background and a second comparison signal if it is more;
   second means, interconnecting the scanner, the stack and storage register, operable by a first comparison signal from the comparison means output, to enter into the storage register aforesaid average of the representations in all of the positions;
   recognition means, connected to the comparison means output and to the scanner, operable upon the occurrence of a second signal following a first signal, to supply an indication that the lowest light level representation has occurred; and
   utilization means, connected to the recognition means and to the scanner, for supplying at an output signals identifying the optical adjustment giving the lowest amount of reflected light.

2. The apparatus of claim 1, wherein the recognition means is further operable by said second signal to supply an indication for causing a fixed plurality of additional scans of the target line to occur after an increase in the amount of reflected light occurs.

3. An apparatus for optimumly adjusting the optical elements of a copier to positions forming images of lines, on an illuminated background, which have the greatest background-to-line illumination contrast; including an electronic scanner for examining, point-by-point, target line and background images; wherein the invention is characterized by means for indicating the optical adjustment at which there is greatest contrast, comprising:
   means for detecting, during scanning, the light level and position of each background point and line examined and supplying at an output light level signals;
   last-in/first-out (LIFO) storage means, connected to the detecting means output for retaining, in each of a plurality of storage positions, the light level signals and for retaining corresponding optical adjustment signals;
   first means, interconnecting the detecting and the LIFO storage means, for sequentially pushing into the LIFO storage the light level as the scanner passes across a target line;
   a background register, for storing signals which are a function of light levels;
   comparsion means, connected to the LIFO storage and background register, for comparing light level signals in the background register with the average of the light level signals in all of the LIFO storage positions, and supplying at an output a "compare" signal if the average is less than the signals in the background register;
   second means, interconnecting the background register and LIFO storage means, operable by a "compare" signal from the comparison means output, to enter into the background register aforesaid average of the signals in all of the LIFO storage positions; and
   utilization means, connected to the storage and comparison means, for supplying at an output signals identifying the optical adjustment at which the lowest amount of light is reflected.

4. The apparatus of claim 3, wherein the utilization means supplies signals only after a fixed plurality of additional target points have been examined following an increase in light between two successive optical adjustments.

5. In a system, wherein focus is determined by scanning an image for the point of greatest illumination contrast between a background and a line on the background, apparatus comprising:
   scanning means, for examining the image point-by-point and indicating, as digital data, the illumination value of each point examined;
   background calculation means, connected to the scanner, for calculating and retaining a background illumination value from the digital data resulting from the scanning of a plurality of background points of the image;
   a data exchange bus, connected to the background calculating means;

a storage stack, connected to the bus, comprising a plurality of locations, each selectively arranged to exchange data either with the bus or with an adjacent location;

first control means, connected to the scanning calculation, bus and stack means, for entering directly into each location the background illumination value and for pushing into the stack successive illumination values from the scanning means;

comparison means, connected to the background calculation means and the stack, for indicating when the background illumination value differs from the average of all the values in the stack;

second control means, connected to the scanning, calculation, bus, stack and comparison means, for retaining in said calculation means the average of all the illumination values in the stack, if the comparison means indicates that the current background illumination value differs from the average in the stack; and third control means, connected to the first and second control means, for indicating that the illumination value most different from the background illumination value has been retained in the calculation means, and supplying the illumination value thereof.

6. The system of claim 5, wherein the third control means additionally causes a fixed number of illumination values to be pushed into the stack when the background value is greater than the average in the stack.

7. In combination:
a master document, carrying lines on a backgroung;
an illumination source, operable to illuminate selected areas of the master document;
a scanner arranged to receive images of illuminated areas of the master document;
a digitizer, connected to the scanner, for supplying digital data representing the illumination intensity of the master document images;
averaging means, connected to the digitizer, operable to receive digital data and compute therefrom current averages of a plurality of successively received digital data;
a first storage, connected to the averaging means, operable to store the current averages one at a time;
a second storage, connected to the averaging means, operable to receive previous averages one at a time;
a comparator, connected to the first and second storages, operable when the current average in the first storage is less than the previous average in the second storage, to transfer the current average to the second storage; and
controls, connected to the scanner and comparator, operable to cause the scanner to continue to receive images when the current average is less than the previous average and to cause the scanner to receive a predetermined number of images when the current average is not less than the previous average.

8. In a combination for automatically adjusting a copier optical system for optimum focus by determining the apparent darkness of a line on a light background while changing the relationship of optical elements in the system to achieve the darkest apparent line; the invention comprising apparatus for indicating the optical relationship giving the darkest line; including:

receiving means, operable to receive the light level signals as the image is scanned, and to supply digital data representing the light levels and the optical adjustment corresponding thereto;

level logic means, connected to the receiving means, operable in accordance with the light level data to initially supply data which is a function of the light level of the background and, subsequently, when a first decrease in light level occurs, to supply data which indicates the light level of a line;

a first position means, connected to the receiving and level logic means, for recording the idicia of the optical relationship at which said first decrease in light level occurs;

a last-in/first-out storage stack, connected to the receiving means, comprising a plurality of individually accessible storage register locations, operable initially to hold in each register aforesaid background light level data and, subsequently, after the first decrease in light level, to receive in an input register aforesaid line light level data as data is pushed into the stack;

averaging logic, connected to the push-up stack, for receiving data stored in all the stack registers, calculating the average of the data and providing a best-focus signal when the stack average is less than a precalculated value; and second position means, connected to the receiving means and the averaging logic, for recording the optical relationship at which the best focus signal occurs.

9. In the combination of claim 8, the averaging logic further including means for continuing to receive additional line light level data after the best-focus signal occurs, supplying another best-focus signal only if additional line light level data causes the stack average to be less than the precalculated value.

10. In a combination for automatically controlling the adjustment of a copier optical system by examining a number of lines on a background; the invention comprising apparatus for finding the edge of a line in accordance with the level of light reflected from an image carrying the line as points on the image are scanned; including:

receiving means, operable to receive the light level signals for each point of the image scanned, and to supply digital data representing the light levels and the position on the image of the point corresponding thereto;

level logic means, connected to the receiving means, operable in accordance with the light level data to initially supply data which is a function of the light levels of points on the background;

averaging logic, connected to the receiving means, for calculating the average of portions of the digital data, providing an indication of light level data that is significantly less than the average, and providing an edge-of-line signal when the line light level data is less than the average; and position means, connected to the receiving means and the averaging logic, for recording the position on the image at which the edge-of-line signal occurs.

11. The combination of claim 10, further comprising apparatus for indicating the apparent focus value of the line in accordance with the level of light reflected from an image carrying the line as points on the image are scanned, including:

a stack, connected to the receiving means, comprising a plurality of individually accessible positions, operable initially to hold in each register aforesaid background light level data and, subsequently, after the edge-of-line signal, to receive in an input position aforesaid line light level data as data is pushed into the stack;

the averaging logic further including means for receiving data stored in the stack positions, calculating the average of the data and providing a best apparent focus value signal when the average is less than a specified variable value; and aforesaid position means, recording identifiers of optical adjustments at which the best apparent focus value signal occurs.

12. The combination of claim 11, wherein the variable value represents the lowest previous average.

13. The combination of claim 11, further including alignment apparatus, for registering the position of the image with respect to fixed position reference axes, comprising:

logic means, connected to the position means, operable in accordance with signals representing the position of a plurality of points on the same line at which edge-of-line signals occur, and signals representing the position of at least one axis to supply adjustment signals representing image position changes required to register at least one line on the image with at least one reference axis; and control means, connected to the comparison means, operable as a function of the adjustment signals to bring the image into registration with the reference axes.

14. The combination of claim 11, further including apparatus for determining and correcting the accuracy of actual magnification relative to a pedetermined, desired, magnification, comprising:

logic means, connected to the position means, operable in accordance with signals representing the position of a plurality of points, at least two of which are on different lines, to supply signals determined by the difference between points on different lines; and comparison means, connected to the logic means, operable to supply correction signals for adjusting the optical system as a function of the signals from the logic means and signals representing the predetermined, desired, magnification.

15. A method for optimumly adjusting the optical elements of a copier to positions forming images of lines, on an illuminated background, which have the greatest background-to-line illumination contrast, comprising the steps of:

(a) examining, point-by-point, target line and background images while changing the optical element relationships;

(b) detecting, during scanning, the light level and position of each background point and line point examined;

(c) supplying, at an output, light level signals;

(d) retaining, in each of a plurality of storage positions, the light level signals;

(e) sequentially entering into a selected one of said storage positions the light level;

(f) recording the position of each current target point in sequence as the scanner progresses across a target line;

(g) causing the contents of each storage position to be moved to an adjacent position;

(h) comparing light level signals in all of the storage positions with the lowest previous value; and (i) supplying at an output signals identifying the optical element relationship at which the lowest amount of light is reflected.

16. A process for focus determination, comprising the steps of:

(a) scanning an image for the point of greatest illumination contrast between a background and a line on the background;

(b) changing the focus setting elements between each scan;

(c) examining the image point-by-point;

(d) indicating, as digital data, the illumination value and focus for each scan;

(e) calculating a background illumination value from the digital data resulting from the scanning of a plurality of background points and the image;

(f) entering directly into each position of a last-in/first-out (LIFO) stack the background illumination value and separately storing the value;

(g) pushing into the stack each illumination value;

(h) indicating when the separately stored value differs from the average of all the values in the stack;

(i) indicating when the stack average is the most different from the background illumination; and (j) supplying the illumination value and the focus setting thereof.

* * * * *